(12) United States Patent
Miller et al.

(10) Patent No.: US 8,715,488 B1
(45) Date of Patent: May 6, 2014

(54) METHOD AND APPARATUS FOR MAKING HYBRID CRUDE OILS AND FUELS

(71) Applicant: Clean Global Energy, Inc., Lewiston, ID (US)

(72) Inventors: Robert Miller, Lewiston, ID (US); Delmar Guenther, Dallas, TX (US); Rick Lutterbach, Long Beach, IN (US); Jeff Nichols, Lewiston, ID (US)

(73) Assignee: Clean Global Energy, Inc., Lewiston, ID (US)

( * ) Notice: Subject to any disclaimer, the term of this patent is extended or adjusted under 35 U.S.C. 154(b) by 0 days.

(21) Appl. No.: 14/070,450

(22) Filed: Nov. 1, 2013

Related U.S. Application Data

(60) Provisional application No. 61/848,636, filed on Jan. 7, 2013.

(51) Int. Cl.
*C10G 9/34* (2006.01)
(52) U.S. Cl.
USPC ........... 208/125; 208/106; 208/107; 208/128; 208/129

(58) Field of Classification Search
CPC .............. C10G 9/12; C10G 9/04; C10G 9/34; C10G 9/36; C10G 9/38; C10G 9/40; C10G 47/22
USPC .......................... 208/106–107, 125, 128–129; 422/234–235
See application file for complete search history.

(56) References Cited

U.S. PATENT DOCUMENTS 4,581,124 A * 4/1986 Gomi et al. ..................... 208/72
4,836,909 A * 6/1989 Matsuo et al. .................. 208/72

* cited by examiner

*Primary Examiner* — Brian McCaig
(74) *Attorney, Agent, or Firm* — Michael A. Glenn; Perkins Coie LLP

(57) ABSTRACT

A simplified process is provided for creating hybrid crude oils and hybrid crude fractions with characteristics superior to the original. The process uniquely combines gases with crude oil or crude fractions in an effervescent turbulent manner at low temperatures and pressures and without the further aid of catalysts. The process breaks large chain hydrocarbons into smaller chain hydrocarbons, molecularly combines carbon, hydrogen, and/or hydrocarbon molecules from the gases with and into hydrocarbon molecules of the crude or crude fraction, and separates contaminants and impurities.

24 Claims, 8 Drawing Sheets

METHOD AND APPARATUS FOR MAKING HYBRID CRUDE OILS AND FUELS

CROSS REFERENCE TO RELATED APPLICATIONS

This application claims priority to U.S. provisional patent application Ser. No. 61/848,636, filed Jan. 7, 2013, which application is incorporated herein in its entirety by this reference thereto.

BACKGROUND OF THE INVENTION

1. Technical Field

The invention relates to crude oil, liquid petroleum fuels, and crude oil transport. More particularly, the invention relates to a method and apparatus for making hybrid crude oils and fuels.

2. Description of the Background Art

Numerous products are derived from crude oil because of the large number of hydrocarbon molecules of varying forms, weights, and lengths contained within, each such product having distinct physical and chemical properties. The mixture of components residing within crude oil is generally categorized as comprising heavy, medium, and light hydrocarbons, based on the relative molecular weights of each such component. In the value chain, the medium components provide the most value, followed by the light components, and then the heavy components. The low relative value of the heavy components is reflected in the lower prices paid for heavy crude as compared to light crude. Higher content of contaminates and impurities also reduces the value of crude oil. As a result, efforts have been directed at developing methods to upgrade the value of crude oil by converting the heavy components into lighter components and extracting contaminants and impurities therefrom.

The large number of components found in crude oil and the complexities involved in the separation of these components dictate that refineries be large in scale. Extraction of crude oil, on the other hand, is widely dispersed and it is therefore necessary to transport the crude oil over long distances to localized refinery sites. The major mode of crude oil transportation is pipelines, which presents significant difficulties for heavy crude oil because the associated high viscosity of heavy crude oil reduces its ability to flow. While many methods of reducing the viscosity of heavy crude oil have been devised, demand for an improved methodology providing simplification, lower costs, and/or elimination of chemical additives remains. Without economically and environmentally viable alternatives for reducing the viscosity of heavy crude, numerous crude oil sources remain or could become uneconomic.

Reducing the levels of pollution associated with the combustion of fossil fuels, i.e. crude fractions, and increasing the mileage associated with transportation fuels is a major focus of the developed world. While the primary focus of efforts has been aimed at improving the systems and components involved in the combustion of fuels and the exhaust thereof, improvements may also be derived by improving the characteristics of the fuels themselves by reducing the average carbon chain lengths and the levels of contaminants and impurities within the fuels.

Many crude oil deposits contain natural gas and other gaseous hydrocarbons that are released from the deposit together with the crude oil. Because the costs and difficulties of transporting these gases are often not supported by the revenues that might be generated by its sale, the gas is often vented to the atmosphere or combusted by flare. Without an onsite or localized use for these gases, such venting or flaring comprises a waste of energy resources and added environmental pollution. Use of such resources for productive purposes would create local as well as larger value.

Methodologies for converting the heavy components of crude oil into lighter components to extract greater economic value have been in continuous development since the early days of the petroleum industry. Cokers and cracking units of various types use high temperatures, often in conjunction with pressure, steam, and/or catalysts to break the heavy hydrocarbon components into lighter hydrocarbon components. Aside from cokers and cracking units, various techniques are known that use a combination of gases, such as methane or hydrogen, in conjunction with heat, pressure, and/or catalysts of various types to create end products that have distillation curves which are shifted downward as compared to that of the original feedstock.

Several methods for reducing the viscosity of heavy crude oil to improve its flow through pipelines exist, all with attendant issues. Heavy crude oil can be blended with petroleum-based additives, such as low-viscosity crude oils or crude fractions, but this requires relatively large amounts of these additives and is feasible only where light crude fields or a refinery are nearby. Pipelines themselves can be heated to improve the flow of heavy oil, but the large capital costs of heating equipment and insulation, along with ongoing costs of supplying heat, make this largely uneconomic. Chemical additives can be mixed with crude oil to decrease its viscosity, but the chemicals used are expensive and are retained in the fuels after refining to be released into the atmosphere when the fuels are burned. As a result of these pollutant issues, refineries are beginning to refuse purchase of crude oils so processed. While there have been various approaches proposed that use methane gases in conjunction with heat and pressure or catalysts of certain types to decrease the viscosity and raise the API of crude oil, few if any such technologies are being used in the field. The lack of commercial acceptance indicates problems including, but not limited to, scalability to the local level, prohibitive capital or operating costs, operational inefficiencies, and/or limited effectiveness of such approaches.

SUMMARY OF THE INVENTION

An embodiment of the invention disclosed herein provides a simplified process for breaking large chain hydrocarbon molecules found in crude oil and crude fractions into smaller chain hydrocarbon molecules, and for separating contaminants and impurities therefrom. Embodiments of the invention uniquely combine gases with crude oil or crude fractions in a robust, effervescent manner at relatively low temperatures and pressures and without the need for further aid of catalysts. Such gases include, but are not limited to, nitrogen, carbon dioxide, carbon monoxide, hydrogen, or hydrocarbons, such as methane, ethane, propane, butane, pentane, ethanol, methanol, or mixtures of two or more thereof, or other combinations and variations thereof, including field waste gas and natural gas. Embodiments of the invention increase the proportionality of higher value middle and light components within crude oil or crude fraction as compared with the original feedstock, i.e. shift of resulting product distillation curve downward as compared to that of the original feedstock; lower the viscosity of heavy crude oil to improve transport flow; create crude fractions with improved characteristics; simultaneously remove contaminates and impurities; molecularly combine hydrocarbon gases with the liquid hydrocarbons; and use gases that might otherwise be wasted.

In general, embodiments of the invention create numerous localized, robust energetic collisions of the gas molecules with the liquid hydrocarbon molecules and ongoing collisions of these molecules within a sustained effervescent, turbulent environment. The process is performed at relatively low temperatures and pressures within a self-contained network of raw material inflow and product outflow. The effervescent collision processes take place within a processing vessel in which the gas of choice is turbulently combined with the crude oil or crude fraction liquid by way of nozzles and nozzle placements and/or alignments that best create the direct robustly energetic mixing of the gas molecules with the liquid hydrocarbon molecules, and that sustain an ongoing turbulent effervescent interaction of the gas and the liquid as the gas molecules rise through the liquid. The process generates a vaporous off-flow from the top of the liquid that rises to the top of the vessel and escapes by way of outlets located on the vessel top. In an embodiment, the vaporous off-flow is drawn through the outlets by way of vacuum and further drawn into and through heat exchangers in which the gases are cooled. As the gases cool, portions condense to liquids that are deposited into a product tank containing the end product. The gases that do not condense in the cooling process are drawn out of the top of the product tank and channeled back into the first-stage processing vessel to be combined with the liquid crude or crude fraction. As the process proceeds, the very heaviest of the liquid hydrocarbon molecules that are not effectively broken down by the process, contaminates, such as sulfur, and impurities, such as sand and water, settle to the bottom of the processing tank and are periodically removed as required. The results of the interactions include the breaking down of liquid hydrocarbon molecules into smaller chain hydrocarbon molecules; the molecular combining of gas hydrocarbon molecules with liquid hydrocarbon molecules; the separation of certain of the heaviest components of the crude oil; and the separation of a material portion of the contaminants and impurities contained in the feedstock.

DETAILED DESCRIPTION OF THE INVENTION

Figure 1:
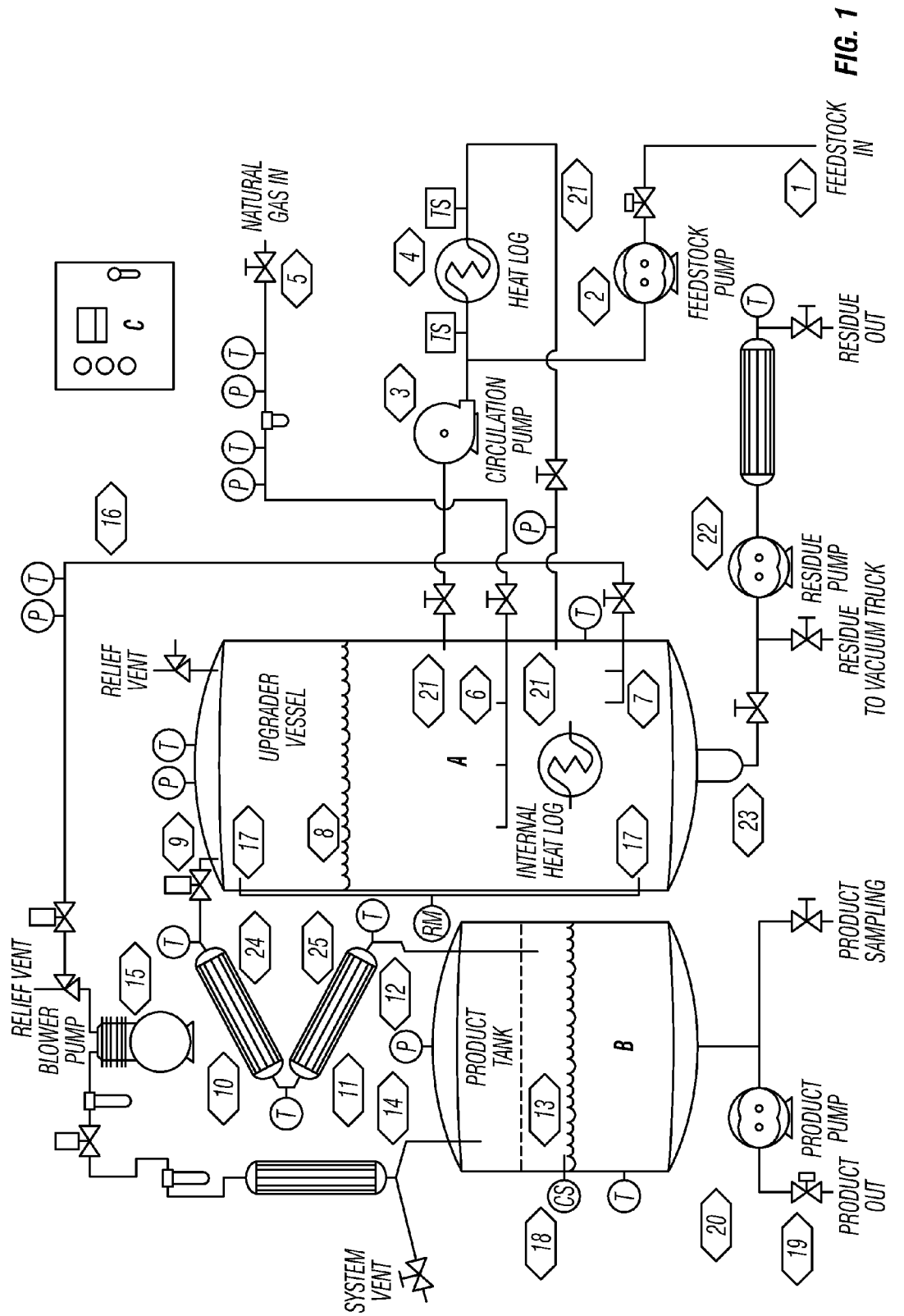
FIG. 1 is a schematic diagram that shows the system flow and system components according to the invention.

FIG. 1 is a schematic diagram that shows the system flow according to the invention. As shown in FIG. 1, liquid crude oil or crude fraction, i.e. feedstock, (1) is passed through a make pump (2) to a recirculating pump (3) where the feedstock is mixed with recycled feedstock (21) drawn from the upgrader vessel (A).

The feedstock can consist of any type of crude oil, including but not limited to, heavy, intermediate, light, sour, or sweet, or any combination thereof, or any crude fraction including, but not limited to, all types of heavy fuel oils, mineral oils, gasoline, diesel, jet fuels, light fuel oils, naphtha, kerosene, cokes, asphalts, or any combinations thereof.

The feedstock is then pumped to a circulation heater (4) in which the feedstock is heated to the appropriate temperature. The heaters can be electrical, gas, or steam units using conventional heating elements. Gas from the locations may be used to create the needed fuel for such heaters, whether it be electric (gas powered generator), steam (water heated by gas heater), or gas heaters that are used. The specific types and sizes of heaters selected are dependent on the best available energy sources, the size of the upgrader vessel, and the location of the operation, i.e. climate, indoor, outdoor. An exemplary embodiment of the invention uses steam heat. The temperature used depends on the type and characteristics of the feedstock and the desired characteristics of the end product. Generally, the temperatures may range between 200 to 450° Fahrenheit, with a more typical range between 240 to 300° Fahrenheit.

The heated feedstock is then fed into the upgrader vessel. The temperature of the feedstock within the upgrader vessel is maintained within a desired range, typically +/−1-3° of the optimal temperature of the applicable process, by the recirculation of the feedstock (21) through the recirculation pump (3) and the circulation heater (4). While the rate of recirculation varies based on required processing temperatures of the feedstock and end-product requirements, as well as the upgrader vessel size, the average rate of recirculation for a 90 gallon prototype upgrader vessel is approximately one to four times per minute. The temperature control signals are sent to the heater units and/or recirculation pump (3) by way of a system integrator (C). The system integrator consists of commercially available parts with specially programmed control software.

The upgrader vessel is filled with feedstock to a level providing appropriate open spacing (8) above the feedstock. The size of the open space (8) depends on the type and characteristics of the feedstock and the desired characteristics of the end product. Generally, the open space may range in size from about 5% to about 50% of the total upgrader vessel volume, with a more typical range being from 20% to 50%. An exemplary embodiment of the invention includes a vessel having a straight cylindrical shape, in which the open space as a percentage of height is equal to its percentage of volume.

The level of the feedstock within the upgrader vessel is maintained within a desired range by a level measurement device (17) that feeds its measurement signals to the system integrator (C), which controls the pumping system (2). An exemplary embodiment of the invention includes a level measurement device in which a radar device uses radar signal return time to measure the distance from the sensor located at the top of the upgrader vessel to the surface level of the feedstock. The radar level sensor signal is fed to the system integrator (C) in conjunction with a signal from the residue pump control (22). The residue pump control alerts the system integrator (C) of the immediacy of residue removal. Appropriate feedstock levels are maintained by the system integrator, using signals provided by both the level measurement device (17) and the residue pump control (22) to generate a feeding control signal which is provided to the pumping system (2).

Once the upgrader vessel is filled with feedstock to the appropriate level, pressurized gas (5) is sent into and through one or more gas injection systems (6) at the appropriate pressure into the pool of feedstock contained in the upgrader vessel. The types of gas that may be used include, but are not limited to, nitrogen, carbon dioxide, carbon monoxide, hydrogen, or hydrocarbon gases such as methane, ethane, propane, butane, pentane, ethanol, or methanol, mixtures of two or more thereof, or other combinations or variations thereof, including field waste gas and natural gas.

In an embodiment of the invention, the pressurized gas (5) used is a non-reactive (non-hydrocarbon) gas, nitrogen, which achieved results similar to embodiments of the invention using hydrocarbon gases propane, methane, and natural gas. In such embodiment, the non-reactive gas initiates the conversion process resulting in crude and crude fraction volatiles that are collected at the top of the product vessel (B) and then directed back to the upgrader vessel, to recycle the gas into the feedstock under pressure, by a gas injector system (7) that is separate from the gas injector system 6 that feeds new pressurized gas (5) into the upgrader vessel.

The pressure at which the gas is sprayed into the feedstock by way of the gas injector system varies depending on the type of gas used and the number of nozzles and configurations thereof, as well as the type and characteristics of the feedstock and the desired characteristics of the end product. Generally, the pressure may range from about 5 psi to about 40 psi, with a more typical range being 12 psi to 25 psi.

The gas flows through one or more gas injection systems and into the feedstock through nozzles designed to maximize dispersal of forceful effervescent collisions of the gas molecules with the liquid feedstock and an ongoing turbulent interaction of the gas with the liquid that is sustained as the gas molecules rise through the feedstock.

In embodiments of the invention, the nozzles may be any devices that dispense the pressurized gas into the feedstock in a manner that creates a streaming, bubbling, or effervescent dispersion of the pressurized gas into the feedstock. Such devices may include, but are not limited to, various shapes and sizes of openings directly within the piping carrying the pressurized gas and/or projecting devices of varying materials, shapes, sizes, and flow dynamics that are attached to the piping carrying the pressurized gas to better control the direction, speed and/or other characteristics of the gas dispersion.

In embodiments of the invention, the gas injector system is laid out in a horizontal orientation within the upgrader vessel, generally within the lower and middle sections of the feedstock pool, but more specifically, above the space allocated for residue at the bottom of the upgrader vessel and below the top of the feedstock level. The piping of the gas injection system is laid out in a grid fashion of any sort to maximize the distribution of the gaseous infusion streams throughout the feedstock.

Figure 2:
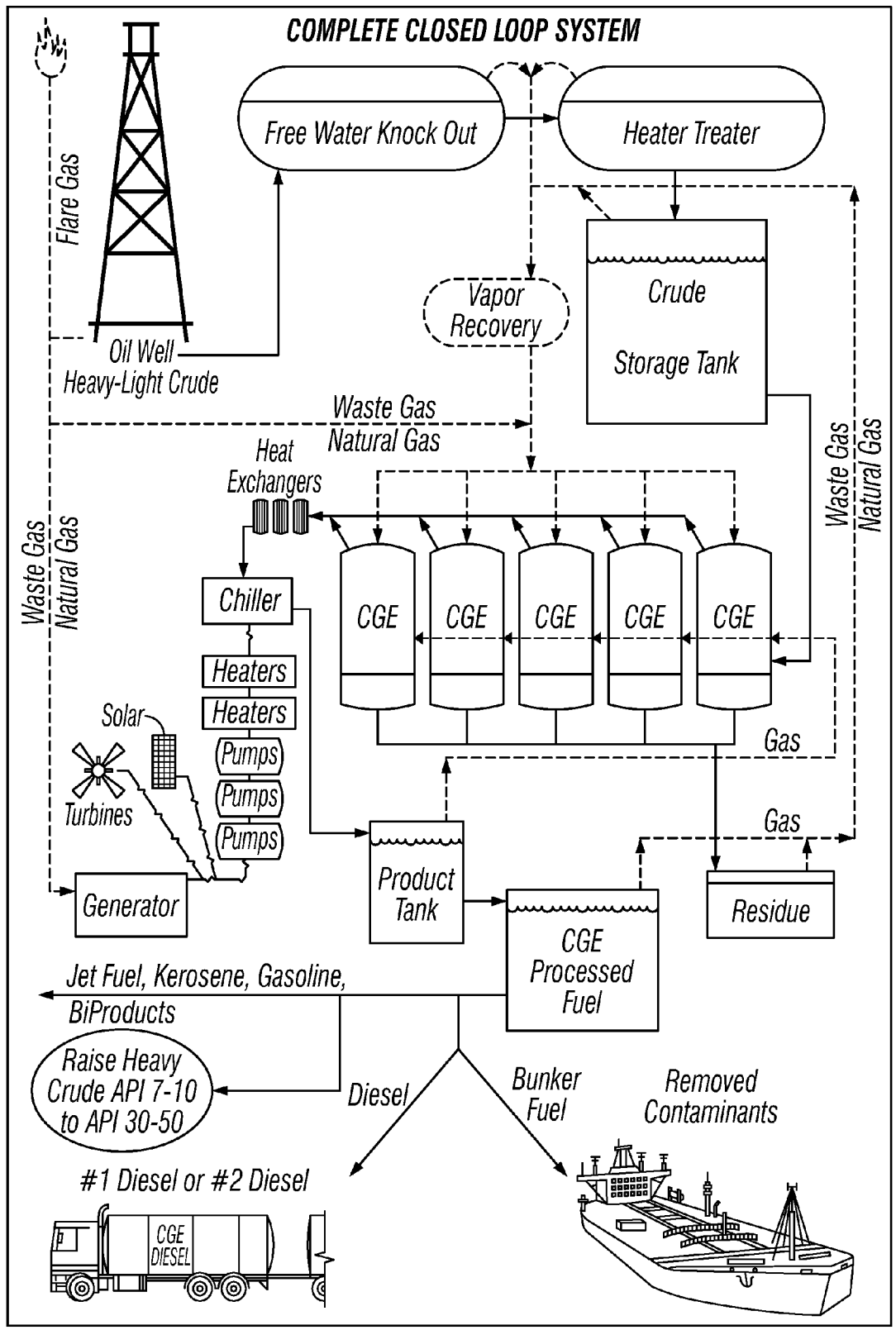
FIG. 2 is a block schematic diagram that shows a complete closed loop system according to the invention.

FIG. 2 is a block schematic diagram that shows how embodiments of the invention can efficiently take crude oil from the well sight using only local components, and create products to feed local distribution of end products, such as jet fuel, kerosene, gasoline, and diesels. Because of the modular nature of the technology, processing plants can be easily adapted to the size requirements of individual oil field sights.

Such local components consist of the field waste gas or natural gas, as well as sun and/or wind that can be harnessed to create electricity. In addition to being used within the process itself, the gases can be burned to create steam for the various heating systems required in the process, while the electricity produced by wind or solar can be used to power the pumps, meters, control center, and other devices requiring electricity.

The gases can be captured as they escape the well itself and also throughout the process, including from the free water knock out and the heater treater operations, which are used to clean the crude of water and other contaminates before it is sent on for processing.

Figure 3:
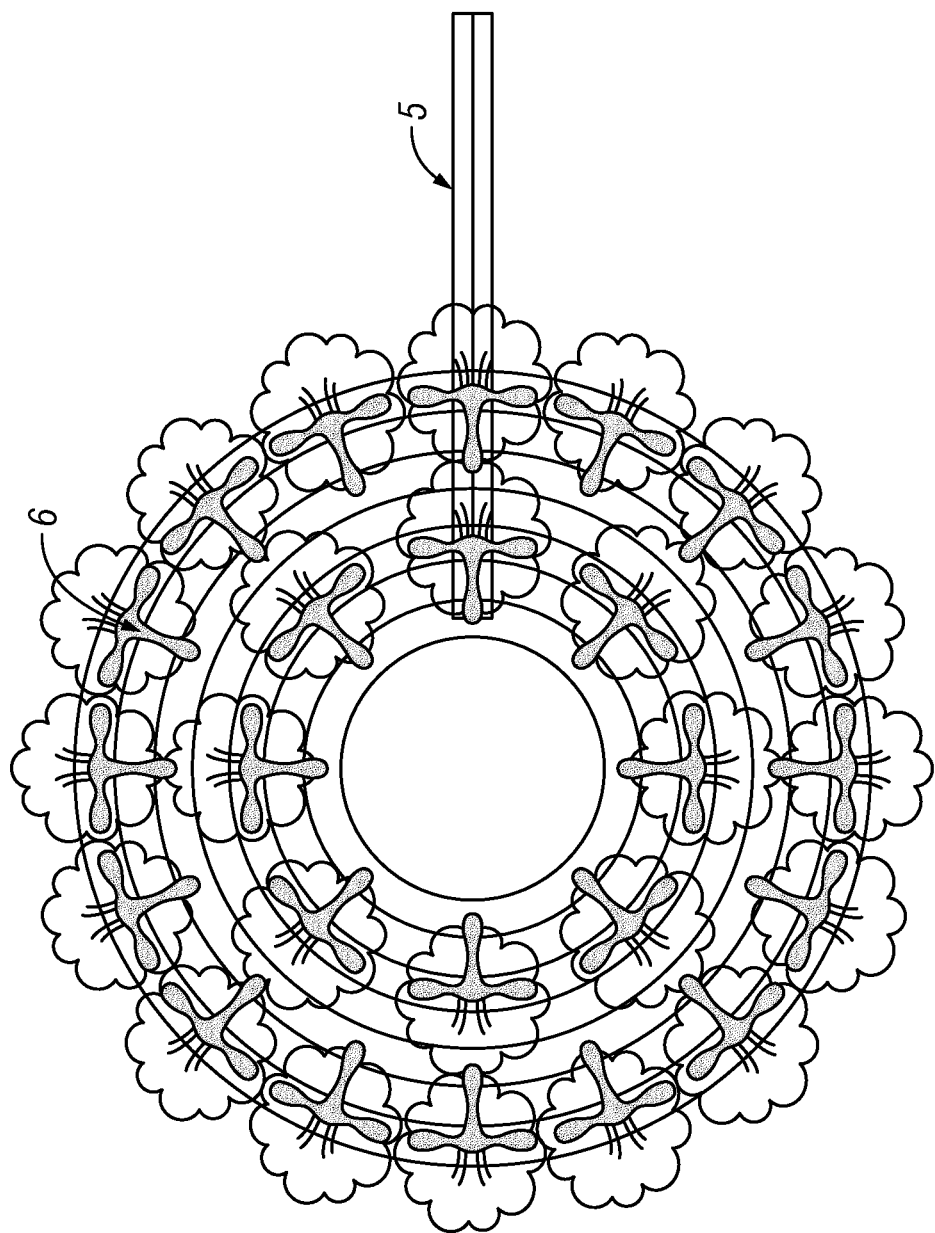
FIG. 3 is a top plan view of an example of a gas injection system according to the invention.
Figure 4:
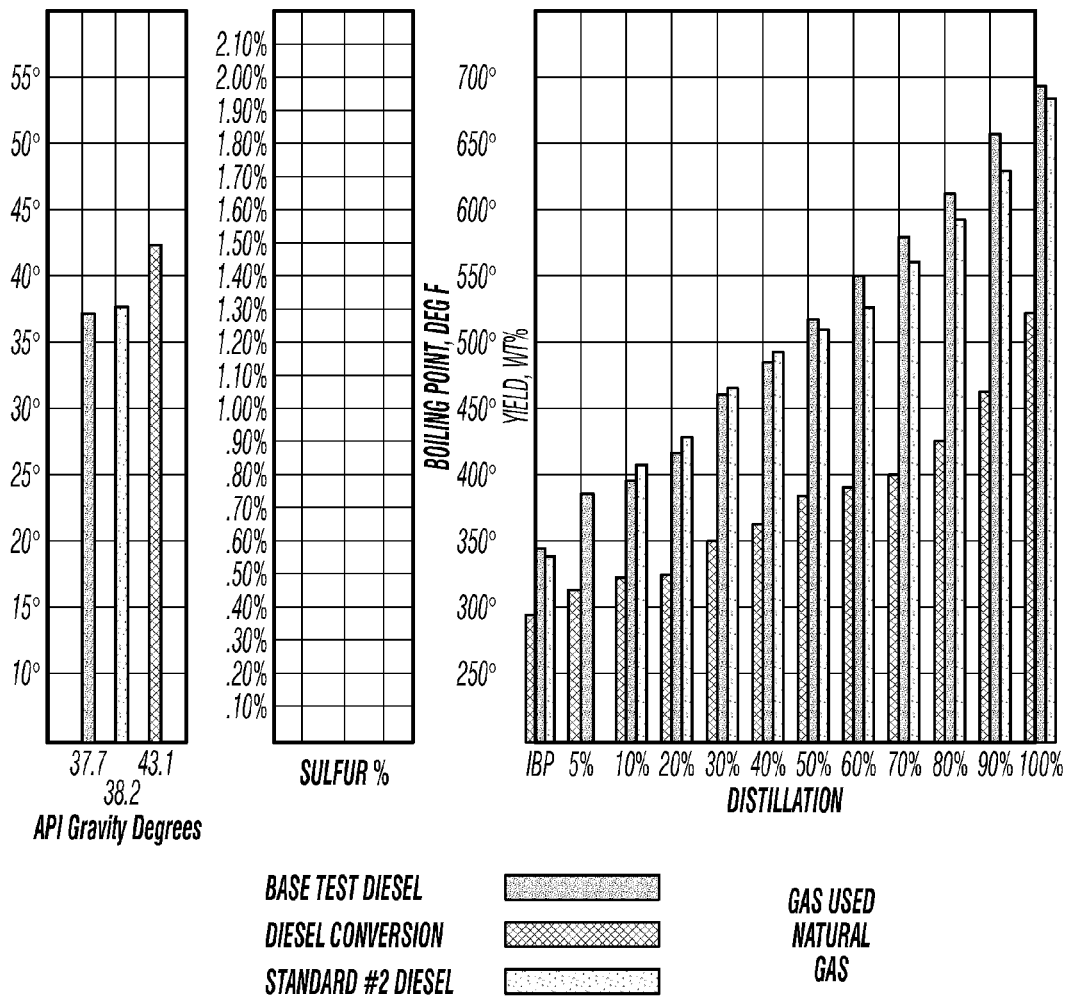
FIGS. 4-8 are test summaries for Tests 1-5
Figure 5:
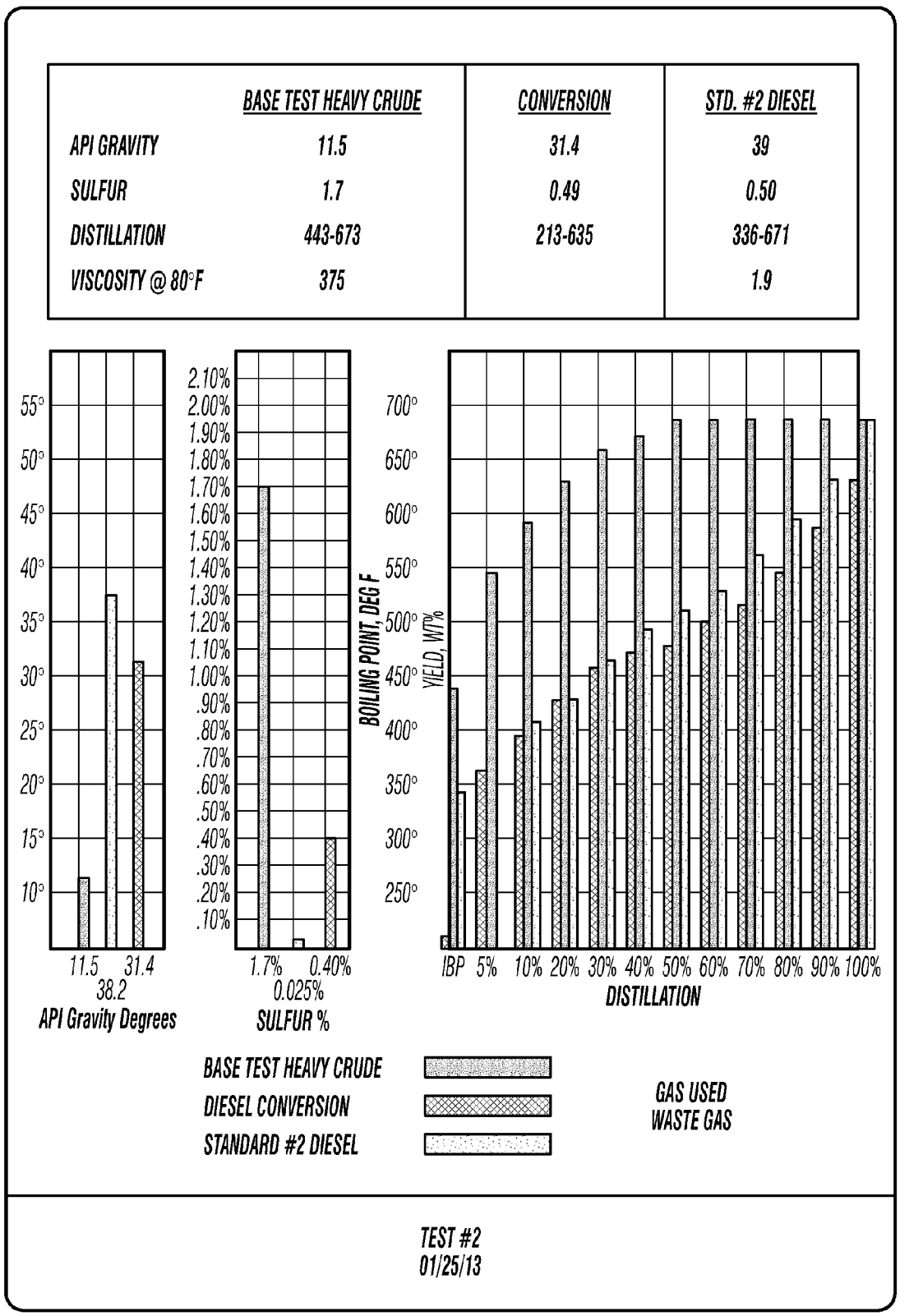
Figure 6:
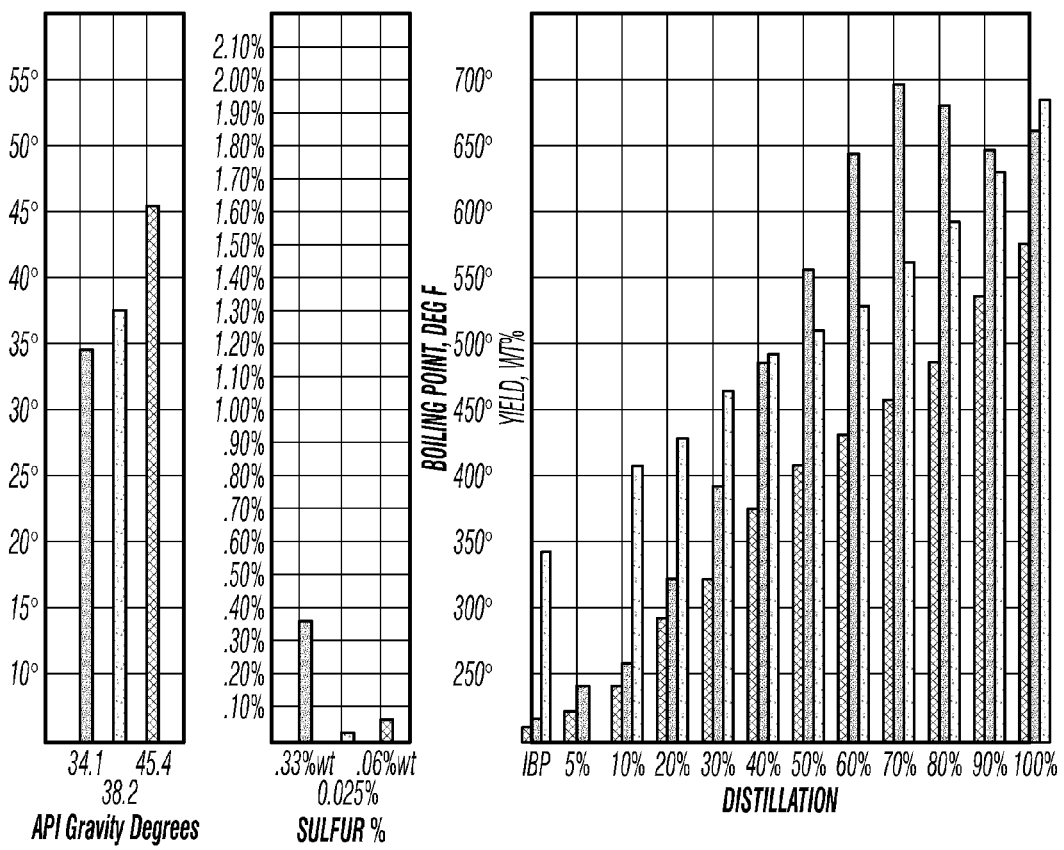
Figure 7:
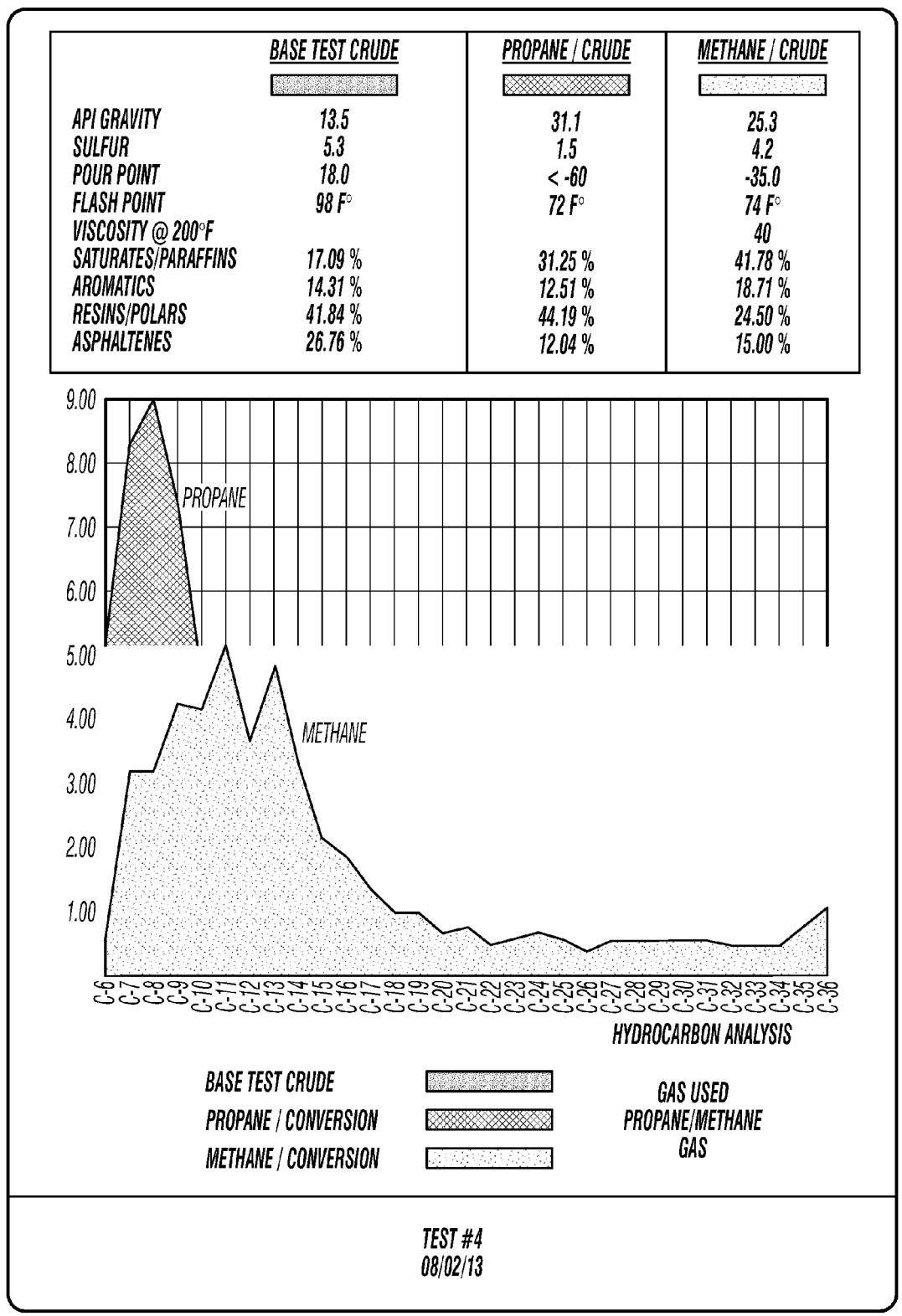
Figure 8:
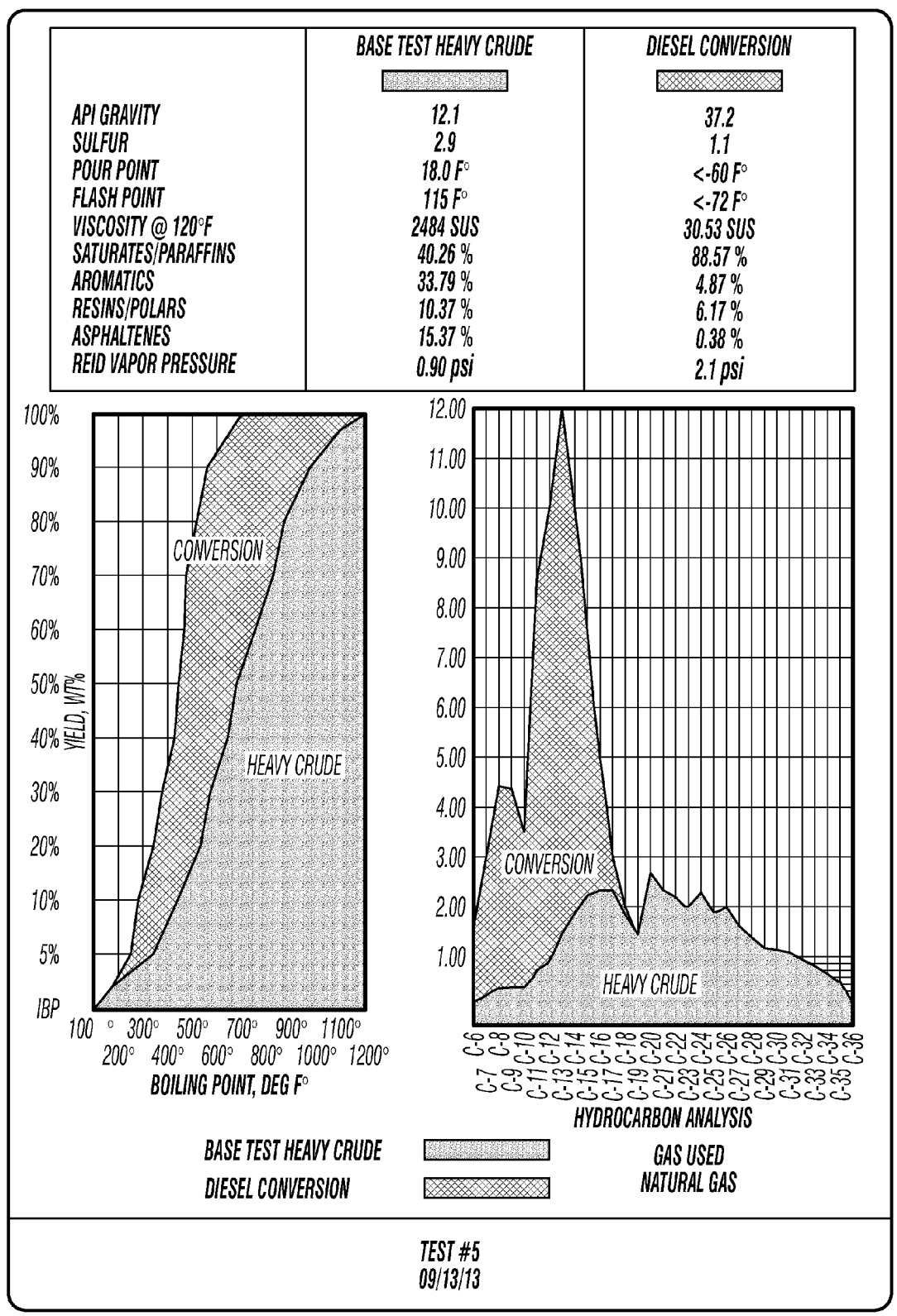

FIG. 3 shows an example of a gas injector system according to the invention. The device consists of piping, through which the pressurized gas flows, in a round shape ("ring") that provides the outer ring with consistent proximity to the inner wall of the cylindrical-shaped upgrader vessel. Within the outer piping ring is a concentric inner piping ring through which gas also flows. Additional rings can be included depending on the upgrader vessel size. In this embodiment of the invention, the nozzles are placed on top of the outer and inner piping rings with even spacing between the groups of nozzles. In an embodiment of the invention, the nozzle groups are placed with three nozzles per group and with pointing angles of the three nozzles such that their sprays of pressurized gases collide with one another to create additional turbulence. Those skilled in the art will appreciate that other nozzles arrangements may be used to practice the invention.

The number of gas injection systems depends on the size of the upgrader vessel, the type of gas used, and the designs of the gas injection systems, as well as the type and characteristics of the feedstock and desired characteristics of the end product. The gas injector systems may be stacked one above another, although alternatives may apply. Generally, two to eight gas injection systems may be used, although other numbers of gas injection systems may be used in other embodiments of the invention.

The gas nozzles are mounted to the piping of the gas injector system in manners to maximize forceful effervescent collisions of the gas molecules with the liquid feedstock molecules and an ongoing turbulent effervescent interaction of the gas with the feedstock that is sustained as the gas molecules rise through the liquid. In embodiments of the invention, the gas nozzles may be pointed vertically and/or angled in an upward fashion to create a bombardment of the spray of one nozzle into the spray of one or more other nozzles.

The number of nozzles used depends on the size of the upgrader vessel and type of gas used, as well as the type and characteristics of the feedstock and desired characteristics of the end product.

One example of an effective gas injection system scheme is shown in FIG. 2, which is a top plan view of a gas injection system where pressurized gas (5) is sent into and through one or more gas injection systems (6) at the appropriate pressure into the pool of feedstock contained in the upgrader vessel. As shown in FIG. 1, as the feedstock reacts with the gas bombardments flowing up through the feedstock, vapors (8) rise from the surface of the feedstock and are drawn out through the vapor outflow manifold (9) and into the heat exchangers (10, 11) where the vapor is cooled.

The number of openings in the vapor outflow manifold and the number of heat exchangers used is dependent on the size and shape of the upgrader vessel and the size of the outflow manifold openings and heat exchangers, as well as the type and characteristics of the feedstock and the desired characteristics of the end product. The number of openings in the outflow manifold can range generally from one to five and the number of heat exchangers can range generally from one to ten.

The heat exchangers, which can be of many various types, including but not limited to plated, tube and chill, shell and tube, plate and shell, and plate fin are kept cool by the heat exchanger cold inputs (24) and exchanger outputs (25). As the vapors pass downward through the primary heat exchangers (10) and then the secondary heat exchangers (11), the vapors are quickly cooled with the cooling causing the formation of liquid condensates.

The liquid condensates and the gaseous vapors that do not condensate in the heat exchangers both flow into and through piping (12) that enters through and into the top or side of a product vessel (B) with the piping continuing down and through the coalescing media (13) to a point at which the condensate and gaseous vapors are discharged into the product vessel (B) below the coalescing media (13) and above highest liquid product level.

The liquid condensates fill the lower portion of the product vessel while the remaining gaseous vapors rise up and into the coalescing media (13), which coalescing action further cools, condenses, and separates out any remaining liquid condensate connected to the vapors, which condensates then fall into the liquids within the product vessel, while the gases, without attached condensate, pass through the coalescing media into a space at the top of the product vessel.

In an exemplary embodiment of the invention, the coalescing media (13) is made of stainless steel material shaped in tortuous path routing such that it provides a suitable surface for oil droplets to condense on the surface, then meet and grow, or coalesce, into larger droplets. As the oil droplets grow in size, their weight eventually results in their dropping into the liquids in the lower portion of the product tank. The gases passing through the coalescing media are thus more fully separated from remaining liquid hydrocarbons that had not previously condensed out of the gases.

The gases collected at the top of the product vessel are drawn out through a gas vent (14) by a compressor and/or blower (15). The gases are then directed back to the upgrader vessel to recycle the gas through a check valve (16) and into the feedstock under pressure, by a gas injector system (7) that may be separate from, and may be situated below, the gas injector system 6 that feeds new gas into the upgrader vessel. In other embodiments of the invention, these recycled gases may be combined with new gases and fed into the feedstock in a combined manner through gas injector system 6.

The gases that recycle back into the process within the upgrader vessel may consist of the new gases (5) introduced into the upgrader vessel, as well as crude and crude fraction volatiles that may separate from the feedstock and not condensate into the product vessel, and gases previously recycled through the system. In an embodiment of the invention, these gases may consist primarily of C-1 through C-5 hydrocarbons, e.g. Pentane having a boiling point of 96° F. and/or Hexane having a boiling point of 154° F. Thus, the recycled gases passing through gas injector system 7 may be different from those newly introduced gases (5) passing through gas injector system 6. Because the recycled gases are typically heavier than the new gases (5), gas injector system 7 may be placed under the new gas delivery injector system 6 to create a more agitative state of the feedstock for the lighter gases introduced above. The heavier gases, because of their large mass and weight, provide for more agitation of the feedstock and breakage of the hydrocarbon molecules which, in turn, provides more opportunity for the connection of the lighter hydrocarbon molecules, which contain a relatively higher ratio of hydrogen to carbon molecules, to newly open and available carbon molecules looking for an opposite charge partner.

Once the product vessel is filled to the maximum level, the level of liquid within the product vessel is maintained within a desired range by one or more level control switches (18) actuated by a capacitance switch. The level control signals, connected via the system integrator (C), govern a motor valve (19) on a liquid product outlet line (20), located at the base of the product vessel, which flows the product to product holding tanks.

At the base of the upgrader vessel, a residue of sand, water, sulfur, heavy hydrocarbons, and other contaminants and impurities accumulates (23) and is monitored by a conductivity monitor or a timing device. As the accumulation reaches a maximum level, a level control pump (22) is activated that removes residue from the upgrader vessel. In an embodiment of the invention, the actuator for the level control pump (22) is a specific gravity potentiometer that signals the system integrator (C) to actuate the removal of residue by the level control pump (22) based on characteristics of the feedstock and the operating parameters being used within the system.

Test Information

Following is a brief discussion of some of the main tests to which crude and crude fractions are subjected. A brief description of the test is provided for each test, as well as why the test is of importance in measuring.

API Gravity

This is a measure of fuel's specific gravity or density. While specific gravity has no units, density is defined as mass per unit volume and both are temperature dependent.

API gravity of diesel fuel has a profound effect on engine power. As a general rule, there is a 3-5% decrease in the thermal energy content of fuel for every ten degree increase in API gravity. This decrease in energy content results in roughly the same percentage decrease in engine power. Use of fuels with higher API gravity also results in higher fuel consumption, e.g. lower MPG.

While there are several scales, generally speaking light, medium, heavy, and extra heavy crude fall within the following API spreads:

Light crude oil is defined as having an API gravity higher than 31.1° API (less than 870 kg/m$^3$);

Medium oil is defined as having an API gravity between 22.3° API and 31.1° API (870 to 920 kg/m$^3$);

Heavy crude oil is defined as having an API gravity below 22.3° API (920 to 1000 kg/m$^3$); and Extra heavy oil is defined with API gravity below 10.0° API (greater than 1000 kg/m$^3$).

Flash Point

The flash point temperature is the minimum temperature at which the fuel ignites (flashes) on application of an ignition source under specified conditions. Flash point varies inversely with the fuel's volatility. Due to its higher flash point temperature, diesel fuel is inherently safer than many other fuels, such as gasoline.

Water and Sediment

Fuels should be clear in appearance and free of water and sediment. The presence of these materials generally indicates poor fuel handling practices. Water and sediment can and do cause shortened filter life or plugged fuel filters, which can, in turn, lead to fuel starvation in the engine. In addition, water can have negative impact on fuel corrosion and on microbial growth.

Distillation

This property provides a measure of the temperature range over which a fuel volatilizes or turns to a vapor. Volatility is one of the primary factors that distinguish #1 from #2 diesel fuel. No. 1 diesel typically has greater volatility than No. 2. The highest temperature recorded during distillation is called the end point. Because a fuel's end point is difficult to measure with good repeatability, the fuel's 90% or 95% distillation point is commonly used.

Kinematic Viscosity

Viscosity affects injector lubrication and fuel atomization. Fuels with low viscosity may not provide sufficient lubrication. Therefore, fuels that do not meet viscosity requirements can lead to performance complaints. Fuel atomization is also affected by fuel viscosity. Diesel fuels with high viscosity tend to form larger droplets on injection, which can cause poor combustion and increased exhaust smoke and emissions.

Ash Content

Ash is a measure of the amount of metals contained in the fuel. High concentrations of these materials can cause injector tip plugging, combustion deposits, and injection system wear.

Sulfur

To assist diesel engine manufacturers in meeting mandated limits for particulate matter in diesel engine exhaust, sulfur content is limited by law to 0.05% for diesel fuel used in on-road applications.

Vapor Pressure

Vapor pressure is an indication of a liquid's evaporation rate. It relates to the tendency of particles to escape from the liquid. A substance with a high vapor pressure at normal temperatures is often referred to as volatile. Vapor pressures of liquids at ambient temperatures increase with decreasing boiling points.

Cetane Number/Cetane Index

Cetane number/index is a relative measure of the interval between the beginning of injection and auto-ignition of the fuel by compression. The higher the number, the shorter the delay interval. Fuels with low Cetane numbers cause hard starting, rough operation, noise, and exhaust smoke. Generally, diesel engines operate better on fuels with Cetane numbers above 50 compared to fuels with Cetane numbers of the national average of approximately 45. The Cetane number may be increased through the refining process or the blending of combustion ignition-improving additives by fuel suppliers.

Cloud Point

Cloud point is the temperature below which the hydrocarbon liquid becomes semi-solid and loses its flow characteristics. Cloud points range from 32° C. to below –57° C.

Lubricity

Lubricity describes the ability of a fluid to minimize friction between, and damage to, surfaces in relative motion under loaded conditions. Diesel fuel injection equipment relies somewhat on the lubricating properties of the fuel. Shortened life of engine components, such as fuel injection pumps and unit injectors, usually can be ascribed to a lack of fuel lubricity and hence is a concern to engine manufacturers.

Types of Carbon Molecules

Crude oil at atmospheric pressure and ambient temperature has three main constituents:
  oils, consisting of both saturates and aromatics;
  resins; and
  asphaltenes.

These components are analyzed by way of a technique that separates crude, which has lost its gaseous components, into its four primary components: saturates, aromatics, resins, and asphaltenes. While saturates and aromatics are oils, asphaltenes, and resins are believed to be soluble, chemically altered fragments of the rocks from which the oil was derived as a result of time and high temperatures and pressures.

Saturates/Paraffins are the most stable hydrocarbon molecules. The molecules have a chemical formula $C_nH_{2n+2}$, indicating that each of the four electrons of all the carbon atoms of the molecule, which are available for bonding, is taken up by a single hydrogen or carbon atom. Because this leaves no electron available for sharing with another atom, paraffin molecules tend to be chemically stable.

Aromatics/Unsaturates are unstable hydrocarbon molecules wherein not all the electrons on the carbon atoms are bonded to separate carbon or hydrogen atoms; instead, two or three electrons may be taken up by one neighboring carbon atom, thus forming a "double" or "triple" carbon-carbon bond. Unsaturated hydrocarbon molecules consist of chain molecules, known as olefins, and ring molecules, known as aromatics. Olefins are typically small in number within crude oil and aromatics typically make up a larger percentage of the crude oil. Due to their unstable nature, aromatic/unsaturated molecules can create problems within fuels so the percentage of such molecules in fuels may be limited by design. Such hydrocarbon atoms are often used as solvents.

Resins are C-5 and C-9 aromatic hydrocarbon molecules that are used in industrial applications due their unique tackifying effects, which is best suited for use in paint, printing ink, adhesives, rubber, and other areas where tackiness is required. Generally, the petroleum resins are not used independently, but have to be used together with other kinds of resins as promoters, adjusting agents and modifiers in hot melt adhesive, pressure-sensitive adhesive, hot melt road marking paint, rubber tires, and so on.

Asphaltenes make up the heaviest, most viscous components of crude oil and are primarily used as material for road construction, waterproofing, and roofing, and as curing agents and corrosion inhibitors. Because of their coagulating nature, asphaltenes are often considered a menace in the oil field, as well as downstream at the refineries. Because asphaltenes are significant constituents of the heavy oils that are now increasingly entering the refinery processing streams, refineries must make changes to their processing in order to adapt.

Tests

Included herein are the results of the five tests conducted by independent third party professional laboratories specializing in petroleum analysis and measurements. The tests are identified as tests 1-5, which relates to the sequential order of the tests. The same tests were not completed for each of the tests, and generally speaking, the number of tests was increased as the merit of the herein disclosed invention became more certain and the inventors began looking for additional information to develop a prototype further.

Test Table #1 includes information from Tests 1-3. The three columns on the left of the table provide base information. Column 1 provides the names of the various ASTM (American Society for Testing and Materials) tests used in the testing. Column 2 provides the specific ASTM number for each of the tests. Columns 3 and 4 provide the average measurements for these tests for standard diesels, #1 and #2, respectively.

Test 1 records the results of the processing #2 diesel with nitrogen and, separately, with natural gas.

The API of the #2 diesel feedstock was 37.7; the Initial Boiling Point (minimum) of the feedstock was measured as 342° F.; the 90% Boiling Point (maximum) was measured as 695° F.; and the Cetane Index was measured as 52.

After processing with Nitrogen and Natural Gas, the API of the products measured as 38.5 and 42.3; the minimum Boiling Point as 382 and 305° F.; the maximum Boiling Point as 576 and 540° F.; and the Cetane Indexes as 42.5 and 35.

Because we are testing for evidence of our lightening crude and crude fractions by way of the cracking of carbon chains, we expected to see an increase in the API; a decrease in the minimum boiling point; and a decrease in the maximum boiling point. We achieved the increase in API with both Nitrogen and Natural Gas; we achieved the decrease in both minimum and maximum boiling points with the Natural Gas. With respect to the Nitrogen, we achieved the reduced maximum boiling point but unexpectedly increased the minimum boiling point.

Test 2 records the results of the processing of a Heavy Crude feedstock with Field Waste Gas being released from the producing wells.

The API of the Heavy Crude feedstock was 11.5; the minimum Boiling Point of the feedstock was measured as 443° F.; the maximum Boiling Point was measured as 673° F.; the minimum Viscosity (at 40° C.) was measured as 375; the sulfur in ppm was measured as 1.7; and the Reid Vapor Pressure was measured as 0.49.

After processing with Field Waste Gas, tests of the resulting product measured the API as 31.4; the minimum Boiling Point as 213° F.; the maximum Boiling Point as 635° F.; the minimum Viscosity was not measured (reason not available); the sediment (in ppm maximum) as 0.400; the water (in ppm maximum) as 5.60; the ash content % as 0.05; the sulfur content (in ppm maximum) as 0.49; and the pour point as <−60° C.

While not all product tests were comparative to Heavy Oil feedstock tests, the comparisons are as follows: the API increased significantly from 11.5 to 31.4; the minimum and maximum Boiling Points decreased from 443 to 213 and from 673 to 635; and the sulfur content was reduced from 1.7 to 0.49.

Test 3 records the results of the processing of a Light Crude feedstock with Propane. Three tests were run under varying operating parameters.

The API of the Light Crude feedstock was 34.1; the minimum Boiling Point of the feedstock was measured as 112.28° F.; the maximum Boiling Point was not recorded (reason not provided); the Flash Point (° F.) was measured at 64.4; the minimum Viscosity (at 40° C.) was measured as 6.64; the sulfur in ppm was measured as 0.3398; the Cetane Index was measured as 51; and the Lubricity (at 60° C.) was measured as 320.

After processing with Propane in three separate runs, tests of the resulting products measured APIs as 49.3, 50.1, and 45.4; the Flash Points as 37.4, 32, and 64.4; the minimum Boiling Points as 102.56, 99.39, and 102.2° F.; the maximum Boiling Points as 530.42, 551.46, and 579.02° F.; the minimum Viscosities as 1.09, 1.08, and 1.27; the sulfur contents (in ppm maximum) as 0.0251, 0.0387, and 0.0625; the Cetane indexes as 39, 32.5, and 48.5; the Cloud Points (in ° C.) as −60, −60, and −35; and the Lubricities (at 60° C.) as 420, 450, and 420.

While not all product tests were comparative to Light Oil feedstock tests, the comparisons are as follows: the API increased from 34.1 to 49.3, 50.1, and 45.4; the minimum Boiling Points decreased from 112.28 to 102.56. 99.39, and 102.2; the Flash Points decreased from 64.4 to 37.4, 32, and 64.4; the Viscosity decreased from 6.64 to 1.09, 1.08, and 1.27; the copper decreased from 0.3398 to 0.0251, 0.0387, and 0.0625; the Cetane Index declined from 51 to 39, 32.5, and 48.5; and the Lubricities increased from 320 to 420, 450, and 420.

TEST TABLE 1

| | ASTM D975 | DIESEL Standard #1-D S15 | DIESEL Standard #2-D S15 | Test #1 DIESEL Dec. 12, 2012 Feedstock | Test #1 Dec. 12, 2012 Nitrogen | Test #1 Dec. 12, 2012 N/G | Test #2 Dec. 26, 2012 Feedstock | Test #2 Jan. 25, 2013 W/G | Test #3 Feb. 28, 2013 Feedstock | Test #3 Feb. 28, 2013 Propane | Test #3 Mar. 11, 2013 Propane | Test #3 Mar. 13, 2013 Propane |
|---|---|---|---|---|---|---|---|---|---|---|---|---|
| API Gravity @ 60 F. | D4052 | 43 | 39 | 37.7 | 38.5 | 42.3 | 11.5 | 31.4 | 34.1 | 49.3 | 50.1 | 45.4 |
| Flash Point F° | D93 | 100.4 | 125.6 | — | — | — | — | — | 64.4 | 37.4 | 32 | 64.4 |
| Sediment PPM max | D2276 | 10 | 10 | — | — | — | — | 0.400 | — | — | 0.090 | 0.010 |
| Water PPM max | D1744 | 200 | 200 | — | — | — | — | 5.60 | — | — | — | — |
| Distillation temp F° | D86 | 90% Volume Recovered: | | | | | | | | | | |
| min | | | 336 | 342 | 382 | 305 | 443 | 213 | 112.28 | 102.56 | 99.39 | 102.2 |
| max | | 550.4 | 671 | 695 | 576 | 540 | 673 | 635 | DNR | 530.42 | 551.46 | 579.02 |
| Viscosity @ 40° C. | D445 | | | | | | | | | | | |
| min | | 1.3 | 1.9 | — | — | — | 375 | — | 6.64 | 1.09 | 1.08 | 1.27 |
| max | | 2.4 | 4.1 | — | — | — | — | — | — | — | — | — |
| Ash % Content | D482 | 0,01 | 0.01 | — | — | — | — | 0.05 | DNR | DNR | DNR | DNR |
| Sulfur ppm, max | D5453 | 15 | 15 | — | — | — | 1.7 | 0.49 | 0.3398 | 0.0251 | 0.0387 | 0.0625 |
| Sulfur % mass, max | D2622 | 0.05 | 0.05 | — | — | — | — | — | — | — | — | — |
| Sulfur % mass, max | D129 | 0.50 | 0.50 | — | — | — | — | — | — | — | — | — |
| Ried Vapor Pressure | | — | — | — | — | — | 0.49 | — | — | — | — | — |
| Cetane index, min. | D613 | 45 | 45 | 52.0 | 42.5 | 35 | — | — | 51 | 39 | 32.5 | 48.5 |
| Cloud Point, ° C. max. | D2500 | varies | varies | — | — | — | — | — | — | <−60° C. | <−60° C. | <−60° C. |
| Lubricity @ 60° C. | D6079 | 520 | 520 | — | — | — | — | — | 320 | 420 | 450 | 420 |
| Saturates/ Paraffins | | — | — | — | — | — | — | — | — | — | — | — |
| Asphaltenes | | — | — | — | — | — | — | — | — | — | — | — |
| Aromaticity, % vol, max | D1319 | 35 | 35 | — | — | — | — | — | — | — | — | — |
| Resins/Polars | | — | — | — | — | — | — | — | — | — | — | — |

TEST TABLE 1-continued

|  | ASTM D975 | DIESEL Standard #1-D S15 | DIESEL Standard #2-D S15 | Test #1 DIESEL Dec. 12, 2012 Feedstock | Test #1 Dec. 12, 2012 Nitrogen | Test #1 Dec. 12, 2012 N/G | Test #2 Dec. 26, 2012 Feedstock | Test #2 Jan. 25, 2013 W/G | Test #3 Feb. 28, 2013 Feedstock | Test #3 Feb. 28, 2013 Propane | Test #3 Mar. 11, 2013 Propane | Test #3 Mar. 13, 2013 Propane |
|---|---|---|---|---|---|---|---|---|---|---|---|---|
| Pour Point | — | — | — | — | — | — | — | <-60 | — | — | — | — |
| Copper Corrosion max | D1302 | 3b | 3b | — | — | — | — | — | DNR | DNR | DNR | DNR |
| Carbon residue 10% | D524 | 0.15 | 0.15 | — | — | — | — | — | DNR | DNR | DNR | DNR |

Test Table #2, on the left side, includes results of tests included in Test Table 1 for Tests 4 and 5. On the right side of the table, beginning from the column headed "Hydrocarbon Analysis," the information provides a comparison of the percentage by weight of each of the carbon molecule sizes (C-6 through C-36+) between the feedstock and the product for Tests 4 and 5.

On the left side of the table, Test #4 records the results of the processing of a Heavy Crude feedstock with Propane and, separately, with Methane.

The API of the Heavy Crude feedstock was measured as 13.5; the minimum and maximum Boiling Points of the feedstock was not measured; the sulfur (as a % of mass, maximum) as 5.3; the Saturates/Paraffins (as a percentage of the weight) as 17.09%; the Asphaltenes (as a percentage of weight) as 26.76%; the Aromatics (as a percentage of weight) as 14.31%; the Resins/Polars (as a percentage of weight) as 41.84%; and the Pour Point as 18.

While not all product tests were comparative to Heavy Oil feedstock tests, the comparisons are as follows: the APIs increased from 13.5 to 31.1 and 25.3; the sulfur declined from 5.3 to 1.5 and 4.2; and the Pour Points declined from 18 to −60 and −35.

With regard to the types of carbon molecules within the Heavy Crude feedstock compared to the products produced utilizing Propane and Methane, respectively, Saturates/Paraffins increased from 17.09% to 31.25% and 41.78%; Asphaltenes decreased from 26.76% to 12.04% and 15.00%; Aromatics changes, from the base of 14.31% were mixed, with the Propane product decreasing to 12.51% and the Methane product increasing to 18.71%; Resins/Polars changes, from the base of 41.84% were mixed, with the Propane product increasing to 44.19% and the Methane product decreasing to 24.50%.

On the left side of the table, Test #5 records the results of the processing of a Heavy Crude feedstock with Natural Gas.

The API of the Heavy Crude feedstock was measured as 12.1; the minimum and maximum Boiling Points as 335 and 1098; the Flash point as 115; the Sediment (ppm) as 0.300; the Water (ppm) as 1.900; the Viscosity minimum and maximum as 986.9 and 2484; the sulfur (as a % of mass, maximum) as 2.9; the Ried Vapor Pressure as 0.90 psi; the True Vapor Pressure as 0.58 psi; the Pour Point as 18; the Saturates/Paraffins (as a percentage of the weight) as 40.26%; the Asphaltenes (as a percentage of weight) as 15.3%; the Aromatics (as a percentage of weight) as 10.37%; the Resins/Polars (as a percentage of weight) as 18%; the Pour Point as 18; and the carbon residue (10%) as 0.90 psi.

While not all product tests were comparative to Heavy Oil feedstock tests, the comparisons are as follows: the API increased from 12.1 to 37.2; the sulfur declined from 2.9 to 1.1; the Sediment declined from 0.300 to Not Detectable; the Boiling Points minimum and maximum declined from 335 to 246 and from 1098 to 606; the Viscosity minimum and maximum declined from 986.9 to 1.330 and 2484 to 30.53; the Ried Vapor Pressure increased from 0.90 psi to 2.1 psi; the True Vapor Pressure increased from 0.58 psi to 1.2 psi; the Pour Point declined from 18 to −60; and the Carbon Residue increased from 0.90 psi to 2.1 psi.

With regard to the types of carbon molecules within the Heavy Crude Feedstock compared to the product, Saturates/Paraffins increased from 40.26% to 88.57%; Asphaltenes decreased from 15.37% to 0.38%; Aromatics decreased from 33.79% to 4.87%; and Resins/Polars declined from 10.37% to 6.17%.

The right side of the table provides a detailed look at the changes in percentage weights of each carbon molecule chain length between the Feedstock and the Product.

In Test #4, with Propane, all the light molecules from C-6 to C-16 increased as a percentage of weight of the Product as compared to the Feedstock; the C-17 molecules stayed the same at 1.1%; and all the heavier molecules from C-18 to C-36+ decreased.

In Test #4, with Methane, all the light molecules from C-6 to C-17 increased as a percentage of weight of the product as compared to the feedstock; the C-18 molecules decreased; the C-19 molecules increased from 0.90% to 0.97%; and all the heavier molecules from C-20 to C-36+ decreased.

In Test #5, all the light molecules from C-6 to C-18 materially increased as a percentage of weight of the product as compare to the feedstock and all the heavy molecules from C-19 to C-36+ materially decreased. The biggest increases in the percentage weight included molecules C-11 through C-15, which are important components of diesel.

TEST TABLE 2

|  | ASTM D975 | DIESEL Standard #1-D S15 | DIESEL Standard #2-D S15 | Test #4 Aug. 2, 2013 Feedstock | Test #4 Aug. 2, 2013 Propane | Test #4 Aug. 2, 2013 Methane | Test #5 Sep. 13, 2013 Feedstock | Test #5 Sep. 13, 2013 N/G |
|---|---|---|---|---|---|---|---|---|
| API Gravity @ 60 F. | D4052 | 43 | 39 | 13.5 | 31.1 | 25.3 | 12.1 | 37.2 |
| Flash Point F° | D93 | 100.4 | 125.6 | 98 | </=72 | 74 | 115 | </=72 |
| Sediment PPM max | D2276 | 10 | 10 | — | — | 100 | 0.300 | ND |
| Water PPM max | D1744 | 200 | 200 | — | — | 700 | 1.900 | — |
| Distillation temp F° | D86 | 90% Volume Recovered: | | | | | | |
| min | | | 336 | — | — | | 335 | 246 |
| max | | 550.4 | 671 | — | — | | 1098 | 606 |
| Viscosity @ 40° C. | D445 | | | | | | | |
| min | | 34 | 35 | — | — | 19 | 986.9 | 1.330 |
| max | | 36 | 39 | — | — | 40 | 2484 | 30.53 |
| Ash % Content | D482 | 0.01 | 0.01 | — | — | — | — | — |
| Sulfur ppm, max | D5453 | 15 | 15 | | | | | |
| Sulfur % mass, max | D129 | | | 5.3 | 1.5 | 4.2 | 2.9 | 1.1 |
| Sulfur % mass, max | D129 | 0.50 | 0.50 | | | | | |
| Ried Vapor Pressure | | — | — | — | — | 1.5 psi | 0.90 psi | 2.1 psi |
| True Vapor Pressure | | — | — | — | — | 1.7 psia | 0.58 psia | 1.2 psia |
| Cetane index, min. | D613 | 45 | 45 | | | | | |
| Cloud Point, ° C. max. | D2500 | varies | varies | — | — | — | — | — |
| Lubricity @ 60° C. | D6079 | 520 | 520 | — | — | — | — | — |
| Saturates/Paraffins | | — | — | 17.09% | 31.25% | 41.78% | 40.26% | 88.57% |
| Asphaltenes | | — | — | 26.76% | 12.04% | 15.00% | 15.37% | 0.38% |
| Aromaticity, % vol, max | D1319 | 35 | 35 | 14.31% | 12.51% | 18.71% | 33.79% | 4.87% |
| Resins/Polars | | — | — | 41.84% | 44.19% | 24.50% | 10.37% | 6.17% |
| Pour Point | | — | — | 18 | −60 | −35.0 | 18 | <−60 |
| Copper Corrosion max | D1302 | 3b | 3b | — | — | — | — | — |
| Carbon residue 10% | D524 | 0.15 | 0.15 | — | — | — | 0.90 psi | 2.1 psi |

| Hydrocarbo Analyses | Test #4 Aug. 2, 2013 Feedstock | Test #4 Aug. 2, 2013 Propane | Test #4 Aug. 2, 2013 Methane | Test #5 Sep.13, 2013 Feedstock | Test #5 Sep.13, 2013 N/G |
|---|---|---|---|---|---|
| C-6 | 1.4 | 5.2 | 0.67 | 0.32 | 1.8 |
| C-7 | 2.0 | 8.1 | 3.4 | 0.43 | 3.1 |
| C-8 | 2.1 | 9.5 | 3.5 | 0.54 | 4.5 |
| C-9 | 1.9 | 7.4 | 4.4 | 0.56 | 4.4 |
| C-10 | 1.3 | 4.7 | 4.2 | 0.57 | 3.6 |
| C-11 | 1.3 | 4.7 | 5.2 | 0.77 | 8.6 |
| C-12 | 1.5 | 5.0 | 3.8 | 0.93 | 10 |
| C-13 | 1.7 | 5.1 | 4.8 | 1.5 | 12 |
| C-14 | 1.5 | 3.6 | 3.4 | 1.9 | 10 |
| C-15 | 1.4 | 2.4 | 2.1 | 2.2 | 7.4 |
| C-16 | 1.4 | 1.8 | 1.8 | 2.3 | 4.9 |
| C-17 | 1.1 | 1.1 | 1.3 | 2.3 | 3.1 |
| C-18 | 1.5 | 1.2 | 0.85 | 1.9 | 2.1 |
| C-19 | 0.90 | 0.57 | 0.97 | 1.6 | 1.3 |
| C-20 | 1.4 | 0.80 | 0.65 | 2.8 | 1.6 |
| C-21 | 1.3 | 0.65 | 0.74 | 2.4 | 0.70 |
| C-22 | 1.1 | 0.52 | 0.49 | 2.2 | 0.4 |
| C-23 | 1.5 | 0.71 | 0.52 | 2.0 | 0.29 |
| C-24 | 1.1 | 0.49 | 0.62 | 2.3 | 0.2 |
| C-25 | 1.3 | 0.58 | 0.56 | 1.9 | 0.11 |
| C-26 | 1.1 | 0.49 | 0.37 | 2.0 | 0.062 |
| C-27 | 1.0 | 0.48 | 0.59 | 1.7 | 0.042 |
| C-28 | 1.3 | 0.59 | 0.52 | 1.5 | 0.025 |
| C-29 | 1.0 | 0.48 | 0.52 | 1.2 | 0.021 |

TEST TABLE 2-continued

| | | | | | |
|---|---|---|---|---|---|
| C-30 | 1.2 | 0.57 | 0.52 | 1.2 | 0.013 |
| C-31 | 1.2 | 0.55 | 0.52 | 1.1 | 0.0078 |
| C-32 | 1.1 | 0.55 | 0.54 | 0.92 | 0.0064 |
| C-33 | 1.0 | 0.48 | 0.48 | 0.84 | 0.0036 |
| C-34 | 0.94 | 0.47 | 0.47 | 0.71 | 0.0043 |
| C-35 | 0.83 | 0.43 | 0.47 | 0.65 | 0.0037 |
| C-36 | 2.0 | 1.3 | 1.1 | 1.3 | 0.020 |

FIGS. 4-8 are test summaries for Tests 1-5 that provide, at the top of each figure, the comparative tests discussed in regard to Test Tables 1 and 2, above. In the middle of each figure, the Test Summaries provide graph curve comparisons. Distillation graph curve comparisons are provided for tests 1, 2, and 3. Carbon Chain graph curve comparison is provided for test 4. Distillation and Carbon Chain graph curves are provided for test 5.

Although the invention is described herein with reference to the preferred embodiment, one skilled in the art will readily appreciate that other applications may be substituted for those set forth herein without departing from the spirit and scope of the present invention.

For example, embodiments of the invention increase the proportionality of higher value middle and light components within crude oil as compared with the original feedstock, i.e. shift of resulting product distillation curve downward as compared to that of the original feedstock; lower the viscosity of heavy crude oil to improve transport flow; create crude fractions with improved characteristics; simultaneously remove contaminates and impurities; molecularly combine gas hydrocarbon molecules with and into the liquid hydrocarbon molecules; and use gases in the productive process that might otherwise be wasted.

Thus, embodiments of the herein disclosed invention find application in upgrading the value of crude oil by converting the heavy components into lighter components, molecularly combining gas hydrocarbons molecules with liquid hydrocarbon molecules, and extracting contaminants and impurities therefrom.

Embodiments of the herein disclosed invention reduce the viscosity of heavy crude oil and provide an improved methodology that results in simplification, lower costs, and/or elimination of chemical additives remains. As such, an economically and environmentally viable alternative for reducing the viscosity of heavy crude is provided, wherein crude oil sources no longer need remain or become uneconomic.

Embodiments of the herein disclosed invention provide improvements in the characteristics of the fuels themselves. Such improvements are thought to result from shortening the average carbon chain lengths within the fuel, which can increase mileage and reduce the fuel's freezing point, and by removing sulfurs and other contaminants that reduce emissions.

Embodiments of the invention address the costs and difficulties of transporting byproduct gases because such gases are used in practicing the invention, and need not be vented to the atmosphere, combusted by flare, or pumped back into the wells. Such onsite or localized use of these gases for providing heat, steam, electricity, and use within the process itself avoids a waste of energy resources and added environmental pollution, and creates local as well as larger value. In addition, by the process of the invention, these short-chain gas hydrocarbon molecules are combined with longer chain liquid hydrocarbon molecules in the final product. Such molecular combination increases the volume of liquid hydrocarbons as compared to the original volume of crude or crude fraction feedstock.

Alternative Uses for the Technology
Oil Field Uses
Heavy Crude Extraction

As crude prices rise, many heavy crude oil fields that were shut down as uneconomic are being re-opened. One technology that is used to help lift the heavy crude is the insertion of diesel or light crude down into the well to mix with the heavy crude that is being pumped out. The added diesel or light crude blends with the heavy crude oil, thus lightening the mixed blended crude. Such lightening then increases the amount of crude that is extracted as well as minimizes the mechanical problems associated with heavy crude. The diesel or light crude must be trucked to and stored at the wellhead location. Embodiment of the invention can be located at the wellhead location to continuous convert portions of the crude production to light crude to insert down into the well as is currently being done with diesel or light crude but with a significant cost and environmental advantage.

Powering Wellhead Operations

Fueling the engines for pumps and other equipment, and for creating electricity from generators, requires diesel be shipped to the wellhead locations. Embodiments of the invention can be located at the wellhead location to continuous convert portions of the crude production to diesel to support the local need for diesel with a significant cost and environmental advantage.

Higher Value Crude

Heavy and extra heavy crude oil typically sells at significantly lower prices than middle and light crude oil. The reasons include higher pipeline shipping costs, due to heavier corrosion and need for the addition of chemicals to the oil or heat to the pipeline to allow the crude to flow, more corrosive materials, internal or added, that need to be removed before refining, and the lower value composition of the carbon chains, e.g. large, heavy chains and asphaltenes are not as valuable to the refineries. Embodiments of the invention can be located at the wellhead location to continuous convert the crude oil into higher value crude so that production revenues increase.

Higher Value Product

Well owners or groups of well owners could form cooperatives or joint ventures to use embodiments of the invention to build small, low cost, environmentally friendly refineries to produce and sell value-added products such diesel and gasoline on a local basis to increase revenues and profits.

Refinery Uses
Refinery Front-End

Refineries could use embodiment of the invention to improve the qualities of the crude oil prior to further processing in the standard manner. Asphaltenes, which cause increased maintenance and repairs on refining equipment, could be separated from the other crude components; corrosive components such as sulfurs and copper could be significantly reduced; the lower value heavy carbon molecules could be reduced by cracking to increase the relative amount of higher value carbon molecules of the crude;

Refinery Additions

Given the relative cost and environmental advantages of the invention disclosed herein, as compared to current refining technologies, refineries could find it more cost effective and easier from a environmental permitting prospective to use embodiments of the invention to increase refining of fuels from crude oil.

Remote/New Refineries

In areas with local availability of crude oil but no refineries, due to the high financial costs, the large scales required, environmental issues, or otherwise, refineries based upon embodiment of the invention can be built on a smaller scale for lower cost, lower operating costs and logistics, and with less environmental issues. Such areas include, but are not limited to, third world countries that can not afford current technologies; areas of increased oil production development within the industrialized countries, such as the Bakkens within the U.S. and the Tar Sands in Canada; offshore oil platforms that could produce its fuel requirements from crude oil it is producing rather than pay the higher costs of having diesel and other fuels shipped to it; military operations that would benefit by having small, local, protectable, and moveable refining capabilities to avoid the dangers associated with shipping in fuels from outside sources; ships that haul crude oil could have onboard refining capabilities to support fuel requirements to minimize fuel stops and reduce costs.

Accordingly, the invention should only be limited by the Claims included below.

The invention claimed is:

1. A method for breaking large chain hydrocarbon molecules found in crude oil and crude fractions into smaller chain hydrocarbon molecules, for molecularly combining gas hydrocarbon molecules with liquid hydrocarbon molecules, and for separating contaminants and impurities therefrom, comprising:
    combining one or more gases with a crude oil or crude fraction feedstock in a turbulent manner at low temperatures and pressures within a self contained network of raw material inflow and product outflow to create numerous localized high energy collisions of gas molecules with liquid hydrocarbon molecules and ongoing collisions of these molecules within a sustained turbulent environment;
    using one or more nozzles, selected nozzle placements, and nozzle alignments to create said collisions within a processing vessel;
    turbulently combining said gases with said crude oil or crude fraction feedstock to force direct high energy collisions of said small chain gas molecules with said larger chain liquid hydrocarbon molecules, and to sustain an ongoing turbulent interaction of said gas and said liquid hydrocarbon molecules as said gas molecules rise through said liquid hydrocarbon molecules;
    generating a gaseous off-flow from a top of a liquid feedstock that rises to a top of said vessel, said gaseous off-flow escaping via one or more outlets located at said vessel top;
    drawing said gaseous off-flow through said outlets and into and through one or more heat exchangers in which said gases are cooled;
    as the gases cool, depositing portions thereof that condense to liquids into a product tank containing an end product;
    drawing gases that do not condense in said cooling step out of the top of the product tank, channeling said gases back into a first stage of said processing vessel, and combining said gases with said liquid crude oil or crude fraction; and
    periodically removing from said processing tank those liquid hydrocarbon molecules that are not effectively broken down, contaminates, and impurities that settle to a bottom of said processing tank.

2. The method of claim 1, further comprising:
effecting breaking large chain hydrocarbon molecules found in crude oil and crude fractions into smaller chain hydrocarbon molecules, molecularly combining gas hydrocarbon molecules with the liquid hydrocarbon molecules, and separating of contaminants and impurities therefrom in the absence of catalysts.

3. The method of claim 1, further comprising any of:
shifting a resulting product distillation curve downward relative to an original feedstock;
lowering viscosity of heavy crude oil to improve transport flow;
creating crude fractions having improved characteristics;
simultaneously removing contaminates and impurities; and
using gases that might otherwise be wasted.

4. The method of claim 1, wherein said gases comprise any of:
nitrogen;
carbon dioxide;
carbon monoxide; hydrogen; and
hydrocarbons, said hydrocarbons comprising any of methane, ethane, propane, ethanol, methanol, and mixtures of two or more thereof;
natural gas; and
combinations of the foregoing.

5. The method of claim 1, further comprising:
passing said liquid crude oil or crude fraction feedstock through a make pump to a recirculating pump where said feedstock is mixed with recycled feedstock drawn from an upgrader vessel.

6. The method of claim 5, further comprising:
pumping said feedstock to a circulation heater to heat said feedstock.

7. The method of claim 6, further comprising:
feeding said heated feedstock into an upgrader vessel; and
maintaining the temperature of said feedstock within said upgrader vessel is maintained within a desired range by recirculating said feedstock through said recirculation pump and said circulation heater.

8. The method of claim 7, further comprising:
sending temperature control signals to any of said circulation heater and said recirculation pump via a system integrator.

9. The method of claim 7, further comprising:
filling said upgrader vessel with feedstock to a selected level to effect open spacing above said feedstock.

10. The method of claim 9, wherein said open spacing comprises from 5% to 50% of said upgrader vessel total volume.

11. The method of claim 9, further comprising:
maintaining said feedstock level within said upgrader vessel within a desired range by a level control that is actuated by a level transmitter;
said level control sending signals are sent to a pumping system via said system integrator.

12. The method of claim 9, further comprising:
once said upgrader vessel is filled with feedstock, sending pressurized gas into and through one or more gas injection systems at a selected pressure into a pool of feedstock contained in said upgrader vessel.

13. The method of claim 12, wherein said pressure ranges from 5 psi to 40 psi.

14. The method of claim 12, further comprising:
arranging a gas injector system in a horizontal orientation within said upgrader vessel, within lower and middle sections of said feedstock pool, above a space allocated for residue at a bottom of said upgrader vessel, and below a top of said feedstock level.

15. The method of claim 12, further comprising:
arranging a gas injector system in a grid fashion to maximize distribution of gas streams throughout said feedstock.

16. The method of claim 15, further comprising:
pointing nozzles of said gas injector system any of vertically and/or angled in an upward fashion to create a bombardment of a gas stream of one nozzle into a gas stream of one or more other nozzles.

17. The method of claim 12, further comprising:
drawing out vapors that rise from a surface of said feedstock, as said feedstock reacts with said gas bombardments flowing up through said feedstock, through a vapor outflow manifold and into one or more heat exchangers.

18. The method of claim 17, further comprising:
cooling vapors that pass downward through said one or more heat exchangers to form liquid condensates.

19. The method of claim 18, further comprising:
conducting liquid condensates and gaseous vapors that do not condensate in said one or more heat exchangers into a product vessel;
wherein liquid condensates fill a lower portion of said product vessel and remaining gaseous vapors rise into and through one or more filter separators.

20. The method of claim 19, further comprising:
drawing gas at a top of said product vessel out through a gas vent and directing said gas back to said upgrader vessel through a check valve and into said feedstock with a gas injector system.

21. The method of claim 20, further comprising:
once the product vessel is filled to a maximum level, maintaining the level of liquid within said product vessel within a desired range via a level control that generates signals which govern a pump.

22. The method of claim 21, further comprising:
monitoring a residue of sand, water, sulfur, heavy hydrocarbons, and other contaminants and impurities accumulates within said upgrader vessel; and
when an accumulation reaches a maximum level, initiating an action to remove residue from said upgrader vessel.

23. The method of claim 1, said feedstock comprising any of:
heavy, intermediate, light, sour, sweet crude oil, and any combination thereof; and
a crude fraction comprising any of heavy fuel oils, mineral oils, gasoline, diesel, jet fuels, light fuel oils, naphtha, kerosene, cokes, asphalts, and any combination thereof.

24. The method of claim 23, further comprising:
heating said feedstock to a temperature between 200 and 450° Fahrenheit.

\* \* \* \* \*